(No Model.)

T. M. FERGUSON.
TIRE TIGHTENER.

No. 301,350. Patented July 1, 1884.

WITNESSES:
Fred. G. Dieterich
Wm. Fecker

Thomas M. Ferguson
INVENTOR.
By Louis Bagger & Co.
ATTORNEYS.

UNITED STATES PATENT OFFICE.

THOMAS M. FERGUSON, OF SUCARNOOCHEE, MISSISSIPPI.

TIRE-TIGHTENER.

SPECIFICATION forming part of Letters Patent No. 301,350, dated July 1, 1884.

Application filed March 24, 1884. (No model.)

*To all whom it may concern:*

Be it known that I, THOMAS M. FERGUSON, of Sucarnoochee, in the county of Kemper and State of Mississippi, have invented certain new and useful Improvements in Tire-Tighteners; and I do hereby declare that the following is a full, clear, and exact description of the invention, which will enable others skilled in the art to which it appertains to make and use the same, reference being had to the accompanying drawings, which form a part of this specification, and in which—

Figure 1:
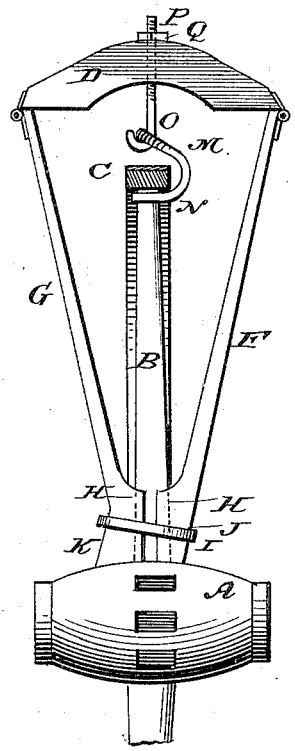
Figure 2:
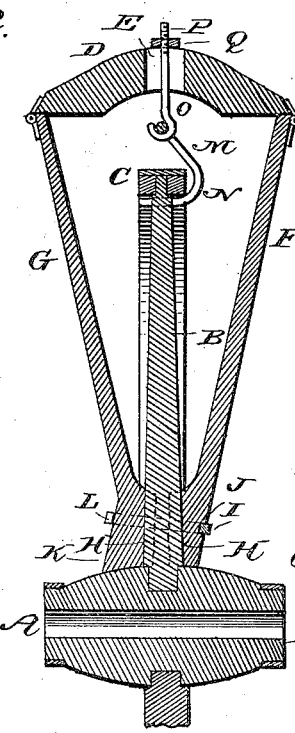

Figure 1 is a side view of my improved tire-tightener applied, showing a portion of the wheel broken away; and Fig. 2 is a vertical section of the same.

Similar letters of reference indicate corresponding parts in both the figures.

My invention has relation to tire-tighteners; and it consists in the improved construction and combination of parts of the same, as hereinafter more fully described and claimed.

In the accompanying drawings, the letter A indicates the hub, B the spoke, and C the tire, of a vehicle-wheel, and D indicates a yoke, having a recess at the center of its under side and a longitudinal slot, E, in its center. Two bars or braces, F and G, are hinged at their upper ends to the ends of the yoke, and bear with the lower portion of the inner edges, which are grooved longitudinally at H, against the edges of the spoke, a clamp, I, clamping around the lower ends of the braces, bearing with one end around the one, F, of the braces in a recess or notch, J, in its outer edge, while the other, G, of the braces is cut off slantingly at its lower end, forming a wedge, K, which may be inserted into the clamp, and be brought to bear between the end of the same and the spoke by driving it down.

The clamp consists of an oblong ring, and has an opening, L, at one end, allowing it to be slipped over the spoke.

M is a yoke, formed by a bent or curved metallic rod, having its ends bent at right angles to the plane of the rod at N, adapted to catch under the inner side of the tire, the yoke being suspended at a hook, O, formed at the lower end of a screw, P, passing through the slot in the yoke D, and having a nut, Q, at its upper end, bearing with its under side against the outer side of the yoke.

By the foregoing description, taken in connection with the accompanying drawings, the operation of my device will be readily understood.

When the tire of a wheel becomes loose, the yoke is placed across the tire, the brace having the recessed lower end is inserted into the closed end of the clamp, the clamp slipped over the lower end of the spoke, and the other wedge-shaped brace inserted into the open end of the clamp and driven down until the braces clamp the spoke tightly. The hooked ends of the metallic yoke are thereupon brought under the tire and the curved portion of the yoke is hooked into the hook upon the lower end of the screw, which then is raised by tightening the nut upon the same, and by raising the screw and the yoke the tire is drawn up, freeing the end of the spoke from its socket, when a leather or metal washer may be slipped over the reduced end of the spoke, bearing upon its shoulder, and the machine be removed and be applied to another spoke, and so forth.

Having thus described my invention, I claim and desire to secure by Letters Patent of the United States—

A tire-tightener consisting of a yoke having a longitudinal slot at its center, a brace hinged to one end of the yoke, and having the inner edge of its lower portion grooved and the outer edge of that portion recessed or notched, a brace hinged to the other end of the yoke, having a wedge-shaped lower end, and having the inner edge of that end grooved longitudinally, an oblong clamping-ring, open at one end and adapted to fit around the ends of the braces, a bent or curved metallic yoke having its ends bent in a plane at right angles to the plane of the yoke, a screw having its lower end bent to form a hook, and provided with a nut, and a washer fitting around the end of the screw, and bearing against the under side of the nut and against the upper side of the yoke, all constructed and combined to operate as and for the purpose shown and set forth.

In testimony that I claim the foregoing as my own I have hereunto affixed my signature in presence of two witnesses.

THOMAS M. FERGUSON.

Witnesses:
J. JONAS,
J. T. CARPENTER.